United States Patent Office 2,993,879
Patented July 25, 1961

2,993,879
PROCESS FOR THE PRODUCTION OF
POLYAMIDES
Rudolf Gabler, Tamins, Johann Giesen, Haldenstein, near Chur, and Walter Zehnder, Chur, Switzerland, assignors to Inventa A.G. für Forschung und Patentverwertung, Lucerne, Switzerland
No Drawing. Filed Oct. 2, 1956, Ser. No. 613,398
Claims priority, application Switzerland Oct. 8, 1955
6 Claims. (Cl. 260—78)

This invention relates to a process for producing polyamides having molecular weights greater than 25,000 by after-condensation in the absence of oxygen at an elevated temperature which, however, is below the melting point of the polyamide under treatment. The characteristic feature of the process of the invention is that the polyamide used contains a very small amount of a water soluble mineral acid or an acid compound thereof containing a group constituting the anion of said acid.

The polyamides hitherto used commercially have, in general, molecular weights of only 10,000 to 25,000 corresponding to an intrinsic viscosity of 0.6 to 1.3, wherein inherent viscosity ($\eta$) is defined by the formula $$(\eta) = \left[\frac{(\eta r - 1)}{C}\right] C \rightarrow 0$$

in which $\eta r$ is the relative viscosity equal to time of flow of the solution through a standard orifice divided by the time of flow of the solvent through the standard orifice, and C is the concentration of the solute in the solvent. The value of $$\frac{\eta r - 1}{C}$$

does not vary greatly with concentration but is approximately a linear function of the latter variable and extrapolation to zero concentration gives theoretically what is known as the intrinsic viscosity ($\eta$). For practical purposes, the intrinsic viscosity is calculated from the foregoing formula by determining the relative viscosity $\eta r$ of a solution of 0.5 g. polyamide in 100 g. m-cresol at a temperature of 25° C. Determination of intrinsic viscosity on the basis of this highly diluted solution gives a value close to that obtained by extrapolation of the intrinsic viscosity curve to zero. The molecular weights of polyamides cannot be substantially increased above these values by the usual polymerization of poly-condensation processes, even if measures, such as, for example, prolongation of the reaction time or increase of temperature are adopted. On the other hand, U. S. specification No. 2,557,808 describes a process in which the polycondensation is carried out in the presence of phosphoric acid or a polybasic acid higher than dibasic, whereby polyamides with higher molecular weights are obtained. In this process, the polycondensation was carried out in the usual melt. Polymerization in the melt, however, is not suitable for the production of polyamides of extremely high molecular weights, because these products are scarcely capable of flowing, so that the complete removal of the polyamide from the polymerization vessel gives rise to very great difficulty.

It has now been found that this difficulty can be obviated by carrying out the polymerization or polycondensation in two stages, the increase in molecular weight to an extremely high value taking place only in the second stage. In the first stage, a preliminary condensation product is made by the usual melt poylmerization and this preliminary product preferably contains the catalyst necessary for the second stage uniformly distributed throughout. The molecular weight of the preliminary condensation product is regulated in such a manner that it can conveniently be brought into a desired solid form.

The after-condensation to polyamides of very high molecular weight takes place in the absence of oxygen by heating the solid material in vacuum or in an inert gas, vapour or solvent.

Whereas for the production of highly viscous polyamides by the melt polymerization process of U.S. patent specification No. 2,557,808, trivalent and polyvalent acids are obviously only suitable, it has been found unexpectedly, that the after-condensation in the solid state can be accelerated by a large number of water soluble mineral acids, it being of no importance whether the acids are mono-, di- or poly-basic. The acid salts and esters of these mineral acids have a similar effect. The acid substances develop their favourable effect at astonishingly low concentrations which are of the order of magnitude of $10^{-3}$ to $10^{-5}$ mol per mol of the polyamide-forming substance.

The polyamides which are suitable for the aftercondensation of the present invention are, for example, poly-$\omega$-aminocarboxylic acids, for example poly-6-aminocaproic acid which is identical with poly-$\epsilon$-caprolactam, poly-7-aminoheptoic acid, poly-11-aminoundecyclic acid, as well as polycondensation products on the basis of diamines and dicarboxylic acids, for example the polyamides from hexamethylene diamine and sebacic acid (nylon 6–10), from ethylene diamine and sebacic acid (nylon 2–10) and other combinations. The polyamides can also be modified in various ways, for example by introduction of side chains, for example N-methylol- and N-alkoxymethyl groups, of aliphatic or aromatic ring systems, or of hetero atoms in the carbon chain, and so forth.

The said polyamides, insofar as they represent commercial products, have molecular weights up to about 25,000 which corresponds to an intrinsic viscosity ($\eta$) of 1.3. Since the relation between ($\eta$) and the molecular weight of commercial polyamides is still disputed and its relation to the molecular weight of more highly polymerized substances is quite uncertain, the intrinsic viscosity ($\eta$) is hereinafter used for characterizing the molecular sizes.

By means of the process of the invention, it is possible to produce polyamides with intrinsic viscosities of 3, 4, 6 and more. A prerequisite is that the polyamides subjected to the after-condensation should contain very small but accurately dosed amounts of a mineral acid or compound thereof as catalyst.

The following substances are suitable for use as catalysts. Mineral acids, for example sulphuric acid, hydrochloric acid, hydrobromic acid, hydriodic acid, chloric acid, perchloric acid, nitric acid, phosphoric acid, polyphosphoric acids and acid salts of the aforesaid acids, for example potassium bisulphate, primary and secondary sodium phosphate and so forth. Halogen derivatives and the esters of the mineral acids are also suitable, for example chlorosulphonic acid, ethylene sulphuric acid, dimethylsulphate, mono-isopropyl-phosphate, triethyl phosphate and so forth. The amount of these acid substances which is necessary depends upon the speed of the condensation which is desired. In general, the catalysts develop their greatest effectiveness between $10^{-5}$ and $10^{-3}$ mol per mol of monomeric polyamide-forming substance. If considerably higher additions are made the effect is partly or entirely lost owing to the stabilizing effect which occurs.

These effects are illustrated in Table 1 which shows the results for the after-polymerization of poly-$\epsilon$-caprolactam with varying amounts of phosphoric acid as catalyst and a condensation time of 24 hours. The optimum effect in this case was with $1 \times 10^{-4}$ mol of phosphoric acid per mol of caprolactam. When other polyamide-forming starting materials, for example hexamethylenediammoniumadipate or other catalysts, for example sulphuric acid were used, the effective optimum may be varied but will remain within relatively narrow limits.

*Table 1*

Alteration of intrinsic viscosity ($\eta$) according to the amount of catalyst (phosphoric acid) added in the after-condensation of poly-$\epsilon$-caprolactam at 190° C. for 24 hours.

| Phosphoric acid content in mol. per mol. of caprolactam: | ($\eta$) |
|---|---|
| $1 \times 10^{-6}$ | 1.88 |
| $3 \times 10^{-6}$ | 2.67 |
| $1 \times 10^{-5}$ | 3.55 |
| $3 \times 10^{-5}$ | 4.40 |
| $1 \times 10^{-4}$ | 5.00 |
| $3 \times 10^{-4}$ | 4.65 |
| $1 \times 10^{-3}$ | 3.70 |
| $3 \times 10^{-3}$ | 2.67 |
| $1 \times 10^{-2}$ | 1.57 |

The addition of the acid catalyst is preferably made to the molten or dissolved monomer before the first stage of the reaction. It can, however, take place during or after this operation. In any case, care should be taken that the catalyst is uniformly distributed by stirring, shaking or otherwise mixing the reacting materials.

The preliminary condensation product which is produced in the known manner is comminuted or pulverized, for example by pressing into bands and cutting or grinding into powder. The preliminary product can also be converted into powder form by dissolving in a solvent and cooling or precipitating with a non-solvent. It is also possible to bring the preliminary polycondensate containing the catalyst into its final form by an injection casting or extrusion process by which it is converted into the form of plates, rods, tubes, wires, foils or even into the form of complicated structures.

The after-condensation of the solid polyamide which has been preformed by one of the above-mentioned methods is carried out at a temperature above 100° C. and below the melting point of the polyamide in question. The most favourable temperature range has been found to be between 140-190° C. In order to avoid damaging the polymeric material by oxidation, the reaction must be carried out in an atmosphere which is as free as possible from oxygen. This can be done, for example, by thoroughly evacuating the vessel in which the after-condensation takes place or washing it with a protective gas, for example nitrogen, hydrogen, argon or carbonic acid, or vapours of high boiling inert solvents, for example hydrocarbons, alcohols, ethers and so forth. The after-condensation can also be carried out equally well in a high boiling liquid, for example, in paraffin oil, mercury or molten Wood's metal.

The after-condensation can be carried out either by a batch process, for example in a rotating drum furnace, or it may be carried out continuously. In the latter case, inclined rotary tubes are used or the polyamide material is moved by means of bands or worm conveyors.

If it is possible to spread out the material to be treated in a thin layer, heating by direct radiation can be usefully employed. Fine-grained powders can also be condensed in cyclone chambers in a stream of hot inert gas.

After treatment, the high molecular weight after-condensate, provided it is present in granular or powder form, can be shaped by an injection moulding machine or a worm press. Finer powders can be shaped by a flame spraying or a pressing or sintering process.

The shaped pieces, foils or other shaped articles which are made from extremely viscous polyamides of the present invention, are distinguished by quite a number of outstanding mechanical properties. Thus, for example, their resistance to heat and bending, and in the case of foils, the resistance to tearing as well as their folding properties are considerably improved as compared with polyamides of normal molecular weight.

Table 2 illustrates how, for example, the resistance to repeated bending in opposite directions of a flat rod of poly-$\epsilon$-caprolactam of 4 millimieters thickness varies depending on ($\eta$).

*Table 2*

Numbers of repeated bendings in opposite directions for polycaprolactam rods. Deflection ±30°, 36 strokes per minute.

| Intrinsic viscosity ($\eta$): | Number of bendings up to the breakage point |
|---|---|
| 1.1 | $1 \times 10^4$ |
| 1.8 | $4.75 \times 10^5$ |
| 2.6 | $1 \times 10^6$ |
| 3.6 | $3.5 \times 10^6$ |

The invention will now be explained with the aid of the following examples but it is not limited thereto.

*Example 1.*—22.6 kg. of caprolactam together with 2.0 litres of water and 10 g. (corresponding to $2.5 \times 10^{-4}$ mol/mol) of 50% phosphoric acid are polymerized at 250° C. in the first place for 2 hours under pressure and thereafter, after releasing the steam, for a further 6 hours at a pressure of one atmosphere until completion. The polymerized product is pressed into the form of a band of 3 millimeters thickness and is cut into pieces of 3 millimeters length. The granular product has an intrinsic viscosity of 1.0 to 1.1.

5 kg. of this preliminarily polymerized product are introduced into a tube having a perforated bottom and a double wall and, after driving out the air with nitrogen, are heated for 18 hours at 186° C. During this after-condensation, the material is continuously washed with 5 litres per minute of nitrogen. After the reaction is complete, the granular product has an intrinsic viscosity ($\eta$)=4.56.

*Example 2.*—A preliminarily polymerized product having an intrinsic viscosity of 1.0 to 1.1 is made by the method described in Example 1 from 22.6 kg. of caprolactam, 2.0 litres of water and 6.8 grams (corresponding to $2.5 \times 10^{-4}$ mol/mol) of potassium dihydrophosphate.

20 kg. of this preliminarily polymerized product in granular form are heated to 180 to 190° C. for 38 hours in a rotating drum furnace in a stream of hydrogen which is absolutely free from oxygen. The granular product obtained has an intrinsic viscosity of 6.28.

*Example 3.*—26.2 kg. of hexamethylenediamineadipate together with 10 litres of water and 2.5 g. of concentrated sulphuric acid (corresponding to $2.5 \times 10^{-4}$ mol/mol) are condensed in a 50 litre autoclave at 250° C. in the first place for 2 hours under pressure and then, after releasing the steam, for a further 6 hours at a temperature of 250° C. under a pressure of one atmosphere until the reaction is complete. The polymer is pressed into the form of a band which is 30 mm. wide and 2 mm. thick, and granulated. The polyamide has an intrinsic viscosity of 0.8 to 1.0.

5 kg. of this preliminary condensate are heated in the apparatus described in Example 1 for 24 hours in a closed system which is under a slight pressure in an atmosphere of decalin vapour at 210° C. After cooling, the lost remnants of the decalin are blown away from the granular polyamide by means of steam. The granular product then has an intrinsic viscosity of ($\eta$)=3.82.

*Example 4.*—A preliminary polymerizate containing $2 \times 10^{-4}$ mol potassium dihydrophosphate per mol of lactam having an intrinsic viscosity of 1.0 to 1.1 is made as in Example 2. One part of this granular product is dissolved in two parts of methanol and stirred in a pressure vessel at a temperature of 180° C. After cooling and drawing off the methanol, the polyamide is obtained in powder form with an average grain size of 2 to 3 mm.

The powder is introduced continuously into a cyclone dryer and treated in countercurrent with oxyen-free nitrogen heated to 180° C., the velocity of which is so regulated that the average falling time of the powder particles is about 30 minutes. A powder having an intrinsic viscosity of $(\eta) = 2.80$ is obtained.

*Example 5.*—A preliminary polymerizate having an intrinsic viscosity of 1.0 to 1.1 is made from 52.6 kg. of caprolactam, two litres of water and 16.3 grams of potassium bisulphate ($3 \times 10^{-4}$ mol/mol).

Plates having dimensions 100 x 100 x 3 mm. are made from the granulated polyamide by an injection moulding process, and are then heated for 18 hours at a temperature of 185 to 190° C. in a bath of boiled paraffin oil (white oil). The material made from these treated plates has an intrinsic viscosity of $(\eta) = 4.12$.

What is claimed is:

1. A process of producing a synthetic linear polyamide having an intrinsic viscosity at least as high as 1.57, which comprises polymerizing a linear polyamide forming material of the class consisting of lactams of ω-aminocarboxylic acids having at least five carbon atoms in the chain between the amino group and the carboxyl group, and mixtures of substantially equimolar amounts of organic diamines and dicarboxylic acids, in the presence of between $1 \times 10^{-6}$ and $1 \times 10^{-2}$ mols per mol of the polyamide forming monomeric material of a catalyst of the class consisting of sulphuric acid, hydrochloric acid, hydrobromic acid, hydriodic acid, chloric acid, perchloric acid, nitric acid, phosphoric acid, and polyphosphoric acid, by heating the polyamide forming material and the catalyst in the presence of water and maintaining the reaction mass as a melt to form a preliminary polyamide with an intrinsic viscosity of at least 1, the amount of catalyst in said polyamide forming material being sufficient to be present in catalyzing form in the preliminary polyamide produced, and treating the preliminary polyamide so formed in an inert atmosphere and in the presence of said catalyst at a temperature above 100° C. but below the melting point of the preliminary polyamide from 30 minutes to 38 hours until the intrinsic viscosity of the polyamide is substantially greater than that of the preliminary polyamide and at least 1.57.

2. The process according to claim 1, wherein the starting material is caprolactam.

3. The process according to claim 1, wherein the starting material is a mixture of substantially equimolar amounts of hexamethylenediamine and adipic acid.

4. The process according to claim 1, wherein the polyamide formed prior to treatment in an inert atmosphere at a temperature above 100° C. but below the melting point is formed into predetermined solid shapes.

5. The process according to claim 1, wherein the polyamide made prior to treatment in an inert atmosphere at a temperature above 100° C. but below the melting point has an intrinsic viscosity of between 1 and 1.5.

6. The process according to claim 1, wherein the temperature of the last mentioned step of treating the polyamide is between 140° and 190° C.

References Cited in the file of this patent

UNITED STATES PATENTS

| | | |
|---|---|---|
| 2,244,192 | Flory | June 3, 1941 |
| 2,510,777 | Gray | June 6, 1950 |
| 2,557,808 | Walker | June 19, 1951 |

FOREIGN PATENTS

| | | |
|---|---|---|
| 676,585 | Great Britain | July 30, 1952 |
| 248,484 | Switzerland | Mar. 16, 1948 |

OTHER REFERENCES

Salisbury, O. G., vol. 654, p. 632–3, January 8, 1952 (abstract).

Ser. No. 327,632, Hagedorn et al. (A.P.C.), published April 20, 1943.